United States Patent [19]

Cole et al.

[11] Patent Number: 4,805,656
[45] Date of Patent: Feb. 21, 1989

[54] POROUS COMPOSITE STRUCTURE

[75] Inventors: Frederic W. Cole, Broken Arrow, Okla.; James B. Padden, W. Bloomfield, Mich.

[73] Assignee: Facet Enterprises Inc., Tulsa, Okla.

[21] Appl. No.: 481,596

[22] Filed: Apr. 4, 1983

[51] Int. Cl.⁴ .............................................. F15D 1/02
[52] U.S. Cl. ...................................... 138/41; 138/42; 210/489
[58] Field of Search ................. 137/13, 1; 138/41, 42; 210/489, 492

[56] References Cited

U.S. PATENT DOCUMENTS

| | | | |
|---|---|---|---|
| 2,323,895 | 7/1943 | Buttner | 138/41 X |
| 2,803,347 | 8/1957 | Whitlock | 138/41 X |
| 2,826,261 | 3/1958 | Eckel . | |
| 2,857,657 | 10/1958 | Wheeler, Jr. . | |
| 2,962,121 | 11/1960 | Wilber . | |
| 2,970,699 | 2/1961 | Leuthesser et al. . | |
| 3,123,446 | 3/1964 | Wheeler, Jr. . | |
| 3,260,370 | 7/1966 | Schwartzwalder . | |
| 3,263,819 | 8/1966 | Schmidt et al. . | |
| 3,266,130 | 8/1966 | Glaze . | |
| 3,353,564 | 11/1967 | Bergeijk | 138/41 |
| 3,358,843 | 12/1967 | Bourdale . | |
| 3,372,533 | 3/1968 | Rummel . | |
| 3,389,032 | 6/1968 | Rosaen et al. . | |
| 3,465,413 | 9/1969 | Rosaen et al. . | |
| 3,679,062 | 7/1972 | Burkhart . | |
| 3,724,502 | 4/1973 | Hayner | 138/41 |
| 3,765,537 | 10/1973 | Rosenberg . | |
| 3,849,314 | 11/1974 | Niccum et al. . | |
| 3,900,629 | 8/1975 | Spencer . | |
| 4,116,841 | 9/1978 | Borsanyi . | |
| 4,183,811 | 11/1980 | Walch et al. . | |
| 4,262,770 | 4/1981 | Spencer . | |

FOREIGN PATENT DOCUMENTS

| | | |
|---|---|---|
| 1012440 | of 0000 | Canada . |
| 0119414 | of 0000 | European Pat. Off. . |
| 1293187 | of 0000 | United Kingdom . |
| 9141 | of 0000 | United Kingdom . |
| 1548233 | of 0000 | United Kingdom . |
| 2008194 | of 0000 | United Kingdom . |
| 1558969 | of 0000 | United Kingdom . |
| 1556052 | of 0000 | United Kingdom . |
| 1262313 | of 0000 | United Kingdom . |
| 1093706 | of 0000 | United Kingdom . |

Primary Examiner—Alan Cohan
Attorney, Agent, or Firm—Remy J. VanOphem

[57] ABSTRACT

A porous composite structure for controlling of gas flow therethrough. The porous composite structure includes a first porous element formed from a sheet having a plurality of perforations with a first total predetermined cross-sectional area. A second porous element formed from a perforated sheet having a second total predetermined perforation cross-sectional area is disposed parallel to the first porous element and spaced a predetermined distance therefrom. At least one intermediate porous element is interposed the first porous element and the second porous element. The intermediate porous element has a total predetermined cross-sectional pore area which is less than the first and second total predetermined cross-sectional areas. Each of the porous elements are bonded to adjacent porous elements to form an integral structure, whereby the intermediate porous element regulates the flow of gas through the porous composite structure while the first and second porous elements mechanically strengthen the porous composite structure. A method of producing the porous element is also disclosed.

26 Claims, 1 Drawing Sheet

POROUS COMPOSITE STRUCTURE

BACKGROUND OF THE INVENTION

1. FIELD OF THE INVENTION

The present invention relates to a porous composite structure having enhanced structural strength. In particular, the porous composite structure of the present invention is suitable for fluidization application and for the control of aerodynamic noise.

2. DESCRIPTION OF THE PRIOR ART

There are a variety of porous composite structure which are designed to solve a number of individual problems. For example, in U.S. Pat. No. 3,260,370, issued to Schwartzwalder on July 12, 1966, relates to a composite filter element for use in filtering and conditioning dry cleaning solvents. In another example, U.S. Pat. No. 3,679,062, issued to Burkhart on July 25, 1972, the composite filter element is designed to resist outward distortion to the filter sheets during the backwashing and cleaning of the filter sheets. Thus, while each of the many prior art composite porous structures solve a unique specific problem, most are unsuitable for a variety of applications such as influidizing media and the control of acoustic noise.

Fluidization occurs when either a liquid or a gas, most commonly ambient air, is moved or blown through a dry powder to separate the particles and permit them to behave as a fluid. More exactly, when a fluid is passd upwardly through a bed of closely sized granular particles, a pressure gradient is required to overcome friction. In order to increase the rate of flow, a greater pressure gradient is required. When the pressure drop approaches the weight per unit surface area of the particles, they begin to move and exhibit fluid properties. There are several major devices advantageously using the fluidization of powder material, including gravity conveyors, powder dryers and coolers, batch powder mixers, bulk storage silos, separators and heat transfer beds.

In the case of gravity conveyors, the fluidization process is used to facilitate transporting a dry powdered material a predetermined distance. A porous sheet having a longitudinally formed trough and having a small angle of incline is used as the conveyor. Thus, while the material is fluidized, it flows somewhat like water along the trough. The conveyor may have a very small angle of inclination which is considerably less than the angle of repose of the powdered material because the material is fluidized.

With respect to powder dryers and coolers, the powder material is fluidized in order to evaporate moisture from the powder or to exchange heat through the powder. Batch powder mixers use fluidization to accomplish the mixing of different powders within a batch. The powders become agitated because of the low resistance to fluid flow while fluidized and thus the powders become throughly mixed.

Silos for holding cement powder and for other bulk storage are additional examples of fluidizing applications. To enable easy removal of the powder from the silo, a fluidized bed at the bottom of the silo blows air through the powder to impart to the powder a fluidized state. Once fluidized, the powder can be removed from the silo by simply blowing the powder out of the silo since the powder acts very much like a liquid.

An example of an application for an illutration separator is separation of grain from impurities such as weed seeds and small stones. In this example, the grain mixture is passed over and moved across a fluidization bed at a very small angle relative to the horizontal. The fluidized mixture is then moved outside of the fluidization bed and is separated by gravity, since the trajectory of the particles will vary. The stones, being heavy, will fall within a comparatively short distance. The grain seeds will fall within a moderately longer distance than the stones while the weed seeds, which are generally much lighter particles than the grain seeds, travel still further.

The use of fluidization in the heat transfer beds consists of placing a part in a fluidization bed of silica or aluminum oxide utilizing hot air as the fluidizing media. The part is heated very rapidly due to the convection effect caused by the motion of the small particles of silica sand or aluminum oxide and the impingement of these particles on the part.

In all of the above mentioned fluidizing applications, porous elements are useful. When choosing a porous element, its strength, its resistance to abrasion and puncture, its ease of cleaning either chemically or by steam, its flow characteristics, its cost, and its ability to operate over a wide range of temperatures are all important considerations.

In addition to the above mentioned considerations, fluidizing applications require that the element have a a strong construction yet have appropriate perforation to provide a high pressure drop uniformly over the element as compared to the pressure drop through the solid particles. This is necessary because, if the pressure drop across the media is similar to the pressure drop across the element, the operation will become unstable which, of course, is undesirable.

One prior art design of a porous element for fluidizing applications utilizes a single plate with a plurality of drilled holes therethrough. It has been found that this design was not satisfactory since the holes weakened the element. Furthermore, it was prohibitively expensive and did not provide the pressure drop characteristics required for fluidizing applications.

In another prior art design of a porous element for fluidizing applications, a layer of wire cloth which has been roll calendered and fusion bonded between two layers of plain mesh weave wire has been found to be moderately successful in some fluidizing media applications. However, an element of this type of construction is also expensive and is difficult to fabricate.

Thus, none of the known art porous element designs provides an inexpensive and easy to fabricate porous media suitable for fluidizing applications.

The control of aerodynamic noise created by gas flow through restrictions and piping systems has also become increasingly important as noise levels in airplanes and in industrial facilities have been subjected to close governmental regulation. A major source of noise in such situations is an aerodynamic phenomenon associated with high velocity flow rate. The high velocity flow rate is created by a rapid expansion of a gas after passing through a flow restriction, thereby creating a localized high velocity flow condition.

To prevent such localized high velocity flow conditions, sophisticated flow path elements have been used to gradually decrease the pressure of the gas so that the velocity remains substantially constant and at a relatively low rate. Such flow path elements may accomplish the desired control of gas velocity, but at a relatively high cost. Furthermore, they limit the flexibility of design because of the varying flow conditions under which these devices must operate. This has led to the consideration of using porous materials. Unfortunately, it is difficult to accurately control pore size in porous materials to prevent localized conditions of high velocity flow created by the currents of relatively small openings.

One such material in which relatively precise control of pore size is obtained is described in U.S. Pat. Nos. 2,457,657 and 3,123,466 and U.S. Application No. 945,261, filed Sept. 22, 1978. This material is formed by a precision winding operation in which wire ribbon material is wound on a mandrel with successive windings being crossed relative to each other to create porous layers having openings of precisely controlled size. The layers of the windings are subsequently diffusion bonded to provide a unitary structure. This approach, however, provides a material which is expensive to make and is susceptible to damage and to plugging of the exposed wire cloth layers.

Accordingly, it is an object of the present invention to provide a controlled porosity composite structure which is adaptable for use in both fluidizing bed and acoustical applications and which is inexpensive and simple to fabricate. The porous composite structure is formed of several porous elements by bonding one layer of weave cloth between two layers of perforated sheets wherein the airflow resistance is controlled by transverse flow paths between the sheets and the cloth with the open mesh transferring stress to the strong perforated sheets.

SUMMARY OF THE INVENTION

The present invention is directed to a composite porous structure useful for both acoustical and fluidizing media applications, which is strong and permits the accurate control of the gas flow characteristics therethrough.

The present invention provides a porous composite structure for control of gas flow expansion therethrough. The composite structure includes a first porous element and a second porous element disposed parallel to the first porous element and spaced a predetermined distance therefrom. The first and second porous elements preferably are perforated sheets having, respectively, a first and second total predetermined cross-sectional perforation area. At least one intermediate porous element is interposed the first and second porous elements. The intermediate porous element has a third total predetermined cross-sectional pore area which is smaller than both the first and second predetermined cross-sectional areas. Each of the porous elements is bonded to adjacent porous elements so that together these porous elements form a single integral composite porous structure. The third total predetermined cross-sectional area is selected to regulate the flow of gas through the composite structure. The first and second porous elements provide mechanical strength to the composite pore structure.

The invention also provides a method of controlling the flow rate of gas flowing from a region of relatively high pressure to a region of relatively low pressure. The method includes the step of disposing a first porous element in juxtaposition to the high pressure region to cause the gas to flow through the first porous element. The first porous element is composed of a perforated sheet having a first total predetermined perforation cross-sectional area. Next, an intermediate porous element is placed contiguous to the first porous element. The intermediate porous element has a third total predetermined pore cross-sectional area which is less than the first predetermined cross-sectional area and is selected to regulate the gas flow velocity flowing through the first porous element and the intermediate porous element. Next, a second porous element similar to the first porous element is placed contiguous to the intermediate porous element in juxtaposition to the low pressure region to cause the gas to flow through the second porous element. The second porous element is a perforated sheet having a second predetermined perforation cross-sectional area which is greater than the third predetermined cross-sectional area. Finally, the first porous element and the second porous element are each bonded to the intermediate porous element to provide a unitary composite porous structure having a mechanical strength greater than the intermediate porous element but having the flow resistance characteristics of the intermediate porous element.

The primary object of the present invention is to provide an inexpensive composite porous structure having desired flow characteristics yet providing great structural strength.

Another object of the present invention is to provide a composite flow structure having the flow characteristics of wire mesh material yet having greater structural strength.

Still another object of the present invention is to provide an inexpensive means for manufacturing composite porous structures for acoustical applications.

Still another object of the present invention is to provide an method for inexpensively manufacturing composite porous structures useful for fluidizing media applications.

These and many other objects, features, and advantages of the present invention will become apparent to those skilled in the art when the following detailed description is read in conjunction with the drawings appended hereto.

DETAILED DESCRIPTION OF THE PREFERRED EMBODIMENT

In the following description and in the appended drawings, a particular embodiment is described utilizing specific terminology for the sake of clarity. The embodiment described and illustrated is the best mode contemplated by the inventor at the time of filing the present application for carrying out the invention. However, it is understood that this description is not intended to be limiting and should not be so construed inasmuch as the invention may take many forms and variations within the spirit and scope of the appended claims.

Figure 1:
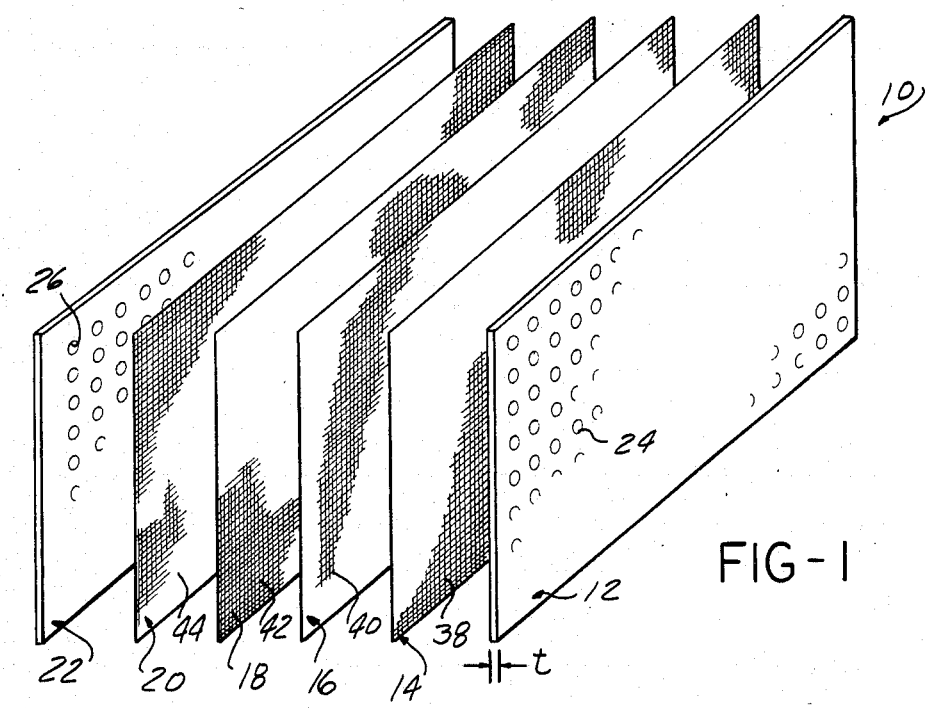
FIG. 1 is an exploded perspective view of an example of a porous composite structure according to the present invention.

Referring now to the drawings, and more particularly to FIG. 1 thereof, a porous composite structure according to the present invention is generally designated by the numeral 10. The porous composite structure includes a first outer porous element 12, four intermediate porous elements 14 through 20 and a second outer porous element 22. Those skilled in the art will recognize that any number of intermediate elements may be utilized in practicing the invention and that the invention is not limited to any specific number of intermediate elements between the first outer porous element 12 and the second outer porous element 22. Each of the elements 12 through 22 are bonded to adjacent elements to form a unitary composite element 10.

The first and second outer porous elements 12 and 22, respectively, are preferably flat, thin metallic sheets having a plurality of apertures 24 and 26, respectively.

Figure 2:
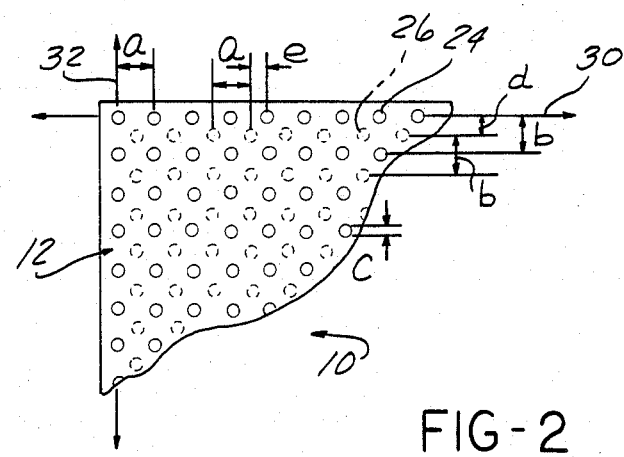
FIG. 2 is a partial front elevational view of the porous composite structure of FIG. 1.
Figure 3:
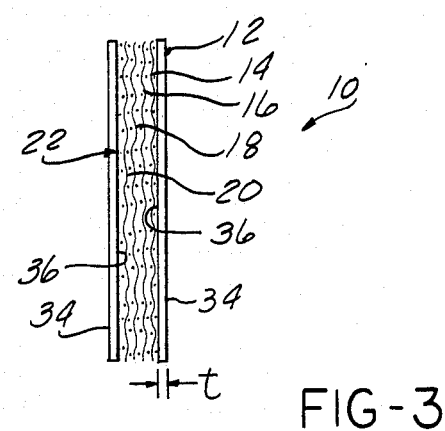
FIG. 3 is a side elevational view thereof.

The apertures 24 in the first outer porous element 12, in the preferred embodiment are arranged in a rectangular array as illustrated in FIGS. 1 and 2. The apertures 24 extend along a first transverse axis 30 and along a second transverse axis 32 which is perpendicular to the first transverse axis 30. Each of the apertures 24 along the first transverse axis 30 are separated by a first distance "a" and, similarly, each of the apertures 24 along the second transverse axis 32 are separated by a second distance "b". Each of the apertures 24 has a diameter measurement "c". The apertures 24 in the first outer porous element 12, therefore, have a first predetermined total aperture cross-sectional area which may be determined by the following formula, where A is the total cross-sectional area of the first outer porous element 12 and P is the total cross-sectional aperture area of the first outer porous element 12:

$$p = (Pi.c^2.A)/(4.a.b)$$

In one example of structure, the first outer porous element 12 is formed from a perforated sheet which has a plurality of apertures having a diameter of three hundredths of an inch (0.030") arranged in a rectangular array having holes spaced twenty-five hundredths of an inch (0.25") apart. This produces a porous element having an open area equal to one percent (1%) of the total area of the sheet.

The second outer porous element 22 may be similar to the first outer porous element 12. In the example illustrated in the drawing, the apertures 26 in the second outer porous element are arranged in a similar rectangular array having longitudinal axes parallel to the longitudinal axes 30 and 32 of the first outer porous element 12 but spaced, respectively, a distance d and e therefrom so as to be somewhat offset from the apertures in the first outer porous element 12.

In the preferred embodiment, each of the first and second outer porous elements 12 and 22, respectively are made from 304 stainless steel having a thickness "t" of fifteen thousandths of an inch (0.015"). Each of the outer porous elements 12 and 22, respectively, have an outer surface 34 exposed to the working fluid and an inner surface 36 for bonding to the intermediate porous elements 14 through 20.

Each of the intermediate porous elements 14 through 20 have a plurality of apertures 38 through 44, respectively, formed therein. The apertures 38 through 44 are formed in arrays each having a third total predetermined aperture cross-sectional area. This third predetermined cross-sectional area is less than both the first predetermined cross-sectional area and the second cross-sectional area of, respectively, the first and second outer porous elements 12 and 22. Therefore, the third predetermined cross-sectional area determines the flow characteristics of the working fluid therethrough.

Preferably, the intermediate porous elements 14 through 20 are formed from a woven wire cloth. In the preferred embodiment, four intermediate elements are provided, each consisting of a 30×30×0.012 sheet of wire mesh material. That is, the wire mesh material is formed of woven wire having a diameter of twelve thousandths of an inch (0.012") which is woven to form cloth having thirty (30) wires per inch in each transverse direction. Preferably, the wire mesh material has been calendered to a thickness of sixteen thousandths of an inch, of an inch to eighteen thousandths (0.016"−0.018") to produce a comparatively flat intermediate porous element 14 through 20. The flattening of the wire mesh material decreases the pore size in the wire mesh material and, further, increases the contact area between the adjacent intermediate porous elements 14 through 20. Furthermore, this process increases the contact area between the outermost intermediate porous elements 14 and 20 and the inner surfaces 36 of the first and second outer porous elements 12 and 22, respectively so as to produce a better bond therebetween.

Each of the porous elements 12 through 22 may be bonded to adjacent porous elements by diffusion bonding procedures, well known in the art, to produce a single unitary composite porous structure. For example, the several porous elements 12 through 22 maybe secured together by such temporary fastening means as tape and, subsequently, fusion bonded by heating in a vacuum or hydrogen atmosphere.

Those skilled in the art will recognize that for acoustic applications the porous composite structure made according to the present invention must be less than thirty percent (30%) transparent. Thus, for this purpose, the composite element is preferably constructed as described above with the first outer porous element 12 offset from the second outer porous element 22 by one hundred and twenty-five thousandths of an inch (0.125") or, half of the distance between adjacent apertures in both transverse directions 30 and 32. Furthermore, for this purpose, the intermediate porous elements 16 and 20 are preferably offset from the adjacent intermediate porous elements 14 and 18 by forty-five degrees (45°) so as to provide a tortuous path for the working fluid through the composite structure.

In an alternate embodiment for fluidizing applications, the intermediate porous elements 14 through 20 used are four layers of zero to forty-five degrees (0°-45°) cross axis oriented one hundred and forty-five (145) mesh plain square weave bolting cloth. These layers of cloth are laminated between two outer porous elements 12 and 22 consisting of layers of perforated plastic sheet with between thirty and fifty percent (30-50%) open area. The outer porous elements 12 and 22 are oriented to provide an offset hole pattern as previously described. The resultant structure is cemented together with reticulating epoxy to form the above described porous composite structure 10 having the advantages and features referred to above.

It will be appreciated by one skilled in the art that the structure formed thereby will have great structural strength in comparison to the structural strength of the wire mesh intermediate porous elements 14 through 20 alone. Nonetheless, the flow characteristics through the porous composite structure 10 will be determined by the flow characteristics through the intermediate porous elements 14 through 20. This is true since the total effective predetermined cross-sectional area of the composite structure will be determined by the pore size of the intermediate porous elements 14 through 20. Those skilled in the art will recognize that the number of intermediate porous elements used in constructing the porous composite structure 10 and the flatness of each intermediate porous element will affect the permeability of the composite structure to fluid flow. Furthermore, the permeability of the porous composite structure 10 can also be affected by a partial angular offset of successive intermediate elements, yfor example, by providing a crossing angle varying from zero to forty-five degrees (0° to 45°) between the adjacent intermediate porous elements 14 through 20. As the crossing angle is decreased, the actual effective pore size of the composite structure decreases.

The stresses normally found in the intermediate porous elements 14 through 20 are transferred to the first and second outer porous elements 12 and 22 in a manner similar to the load carrying characteristics of a conventional "I" beam construction, in common use in civil engineering applications. Thus, the weaker portion of the construction controls the flow characteristics of the gas whereas the stronger portion of the construction controls the strength of the composite structure. This composite construction further provides a porous element which is comparatively light and abrasion resistant in comparison to structures having similar strength and porosity characteristics. Finally, the composite structure 10 provides a porous element which is comparatively lightweight and abrasion resistant in comparison to other porous elements constructed by prior art methods having similar flow rate and weight characteristics.

While the present invention has been described in connection with preferred embodiments and methods, it will be understood that it is not intended to limit the present invention to those embodiments and methods. On the contrary, it is intended to cover all alternatives, modifications and equivalents as may be included within the spirit and scope of the present invention as defined by the appended claims.

What is claimed as novel is as follows:

1. A porous composite element for the control of gas flow expansion therethrough, comprising:
    a pair of porous elements, one of said pair of porous elements being adjacent but spaced apart from the other of said pair of porous elements, each of said pair of porous elements comprising a sheet having a first plurality of perforations defining a total predetermined perforation cross-sectional area;
    at least one intermediate porous element interposed the one and the other of said pair of porous elements, said at least one intermediate porous element having a plurality of pores defining a total predetermined pore cross-sectional area smaller than said total predetermined perforation cross-sectional area ; and
    means for bonding said at least one intermediate porous element to said pair of porous elements in face-to-face contact to form an integral structure whereby said at least one intermediate porous element regulates the gas flow through said composite porous element and said pair of porous elements mechanically strengthen said composite porous element.

2. The porous composite element of claim 1 wherein said total predetermined pore cross-sectional area is selected to regulate the flow of gas therethrough.

3. The porous composite element of claim 1 wherein said intermediate porous element is a square weave wire cloth.

4. The porous composite element of claim 1 wherein said intermediate porous element comprises four sheets of plain square weave bolting cloth.

5. The porous composite element of claim 1 wherein said plurality of perforations is a plurality of equally spaced apertures formed therethrough.

6. The porous composite element of claim 5 wherein said plurality of equally spaced apertures form a square array.

7. The porous composite element of claim 5 wherein said equally spaced apertures of one of said pair of porous elements are transversely offset a predetermined distance from said equally spaced apertures of the other of said pair of porous elements.

8. The porous composite element of claim 1 wherein said intermediate porous element is roll calendered, thereby decreasing said total predetermined pore cross-sectional area to a reduced total pore predetermined cross-sectional area.

9. The porous composite element of claim 1 wherein said bonding means further comprises diffusion bonding means.

10. The porous composite element of claim 1 wherein said bonding means further comprises adhesive bonding means.

11. A device for controlling gas flowing from a region of relatively high pressure to a region of relatively low pressure by limiting the gas flow velocity comprising:
    a first porous element disposed in juxtaposition to said high pressure region to cause said gas to flow through said first porous element, said first porous element being composed of a perforated sheet having a first plurality of apertures selected to define a first total perforation cross-sectional area;
    at least one intermediate porous element placed contiguous to said first porous element, said at least one intermediate porous element having a second plurality of apertures selected to define a second total perforation cross-sectional area smaller than said first total perforation cross-sectional area to regulate the gas flow velocity flowing past said first porous element;
    a second porous element placed contiguous to said at least one intermediate porous element in juxtaposition to said low prssure region to cause said gas to flow through said second porous element, said second porous element being composed of a perforated sheet having a third plurality of apertures defining a third cross-sectional total perforation area larger than said second total perforation cross-sectional area; and
    wherein said first porous element is bonded in face-to-face contact with said at least one intermediate porous element and with said second porous element to increase the mechanical strength of said first, at least one intermediate, and second porous elements to flow resistance in order to decrease said gas pressure to that existing in said low pressure region without exceeding a predetermined gas flow velocity.

12. The device of claim 11 wherein said at least one intermediate porous element is a square weave wire cloth.

13. The device of claim 11 wherein said at least one intermediate porous element comprises four sheets of plain square weave bolting cloth.

14. The device of claim 11 wherein said first and third plurality of apertures are equally spaced apertures formed therethrough.

15. The device of claim 14 wherein said plurality of equally spaced apertures form a square array.

16. The device of claim 11 wherein said first plurality of equally spaced apertures of said first porous element is transversely offset a predetermined distance from said third plurality of equally spaced apertures of said second porous element.

17. The device of claim 11 wherein said at least one intermediate porous element is roll calendered, thereby decreasing said second total cross-sectional area.

18. A porous composite element for the control of a working fluid flowing therethrough comprising:
   a first porous element, said first porous element comprising a perforated sheet having a first plurality of perforations defining a first total perforation cross-sectional area;
   a second porous element adjacent to said first porous element but spaced apart therefrom, said second porous element comprising a perforated sheet having a second plurality of perforations defining a second total perforation cross-sectional area;
   at least one intermediate porous element interposed said first and second porous elements, said at least one intermediate porous element having a plurality of pores defining a third total cross-sectional area smaller than said first and said second total cross-sectional areas whereby said at least one intermediate porous element regulates the flow of gas through each of said first and second porous elements; and
   means for bonding said at least one intermediate porous element to each of said first and second porous elements in face-to-face contact to form an integral composite structure whereby said first and second porous elements mechanically strengthen said porous composite element.

19. The porous composite element of claim 18 wherein said at least one intermediate porous element is a square weave wire cloth.

20. The porous composite element of claim 18 wherein said at least one intermediate porous element comprises four sheets of plain square weave bolting cloth.

21. The porous composite element of claim 18 wherein said first and second plurality of perforations are a first and second plurality of equally spaced apertures respectively formed therethrough.

22. The porous composite element of claim 21 wherein said each of said first and second plurality of equally spaced apertures form a square array.

23. The porous composite element of claim 21 wherein said plurality of equally spaced apertures of said first porous element is transversely offset a predetermined distance from said plurality of equally spaced apertures of said second porous element.

24. The porous composite element of claim 18 wherein said at least one intermediate porous element is roll calendered, thereby decreasing said third total cross-sectional area to a fourth total cross-sectional area.

25. The device of claim 11 wherein said at least one intermediate porous element is bonded to each of said first and second porous elements by diffusion bonding.

26. The device of claim 11 wherein said first porous element is bonded to said at least one intermediate porous element and to said second porous element by an adhesive bond.

* * * * *

UNITED STATES PATENT AND TRADEMARK OFFICE
CERTIFICATE OF CORRECTION

PATENT NO. : 4,805,656
DATED      : February 21, 1989
INVENTOR(S) : Cole et al

It is certified that error appears in the above-identified patent and that said Letters Patent is hereby corrected as shown below:

Column 2, Line 13, delete " fluidization " and insert ---- fluidized ----.

Column 2, Line 50, after " known" insert ---- prior ----.

Column 5, Line 54, before "outer" insert ---- first and second ----.

Column 7, Line 9, delete "yfor" and insert ---- for ----.

Signed and Sealed this

Twelfth Day of December, 1989

*Attest:*

JEFFREY M. SAMUELS

*Attesting Officer*    *Acting Commissioner of Patents and Trademarks*